(No Model.)
S. KENNEDY & S. G. WARNER.
VEHICLE AXLE.
No. 294,632. Patented Mar. 4, 1884.
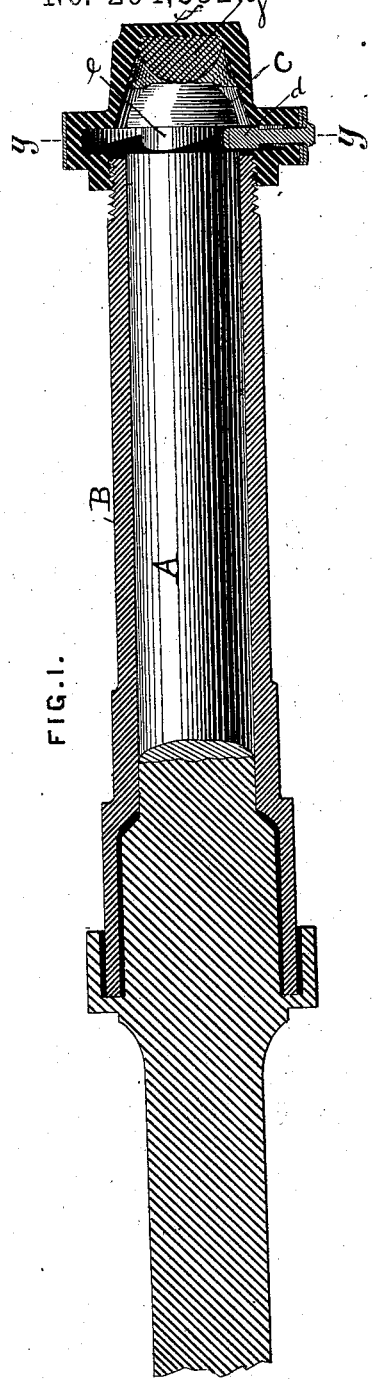
FIG. 1.
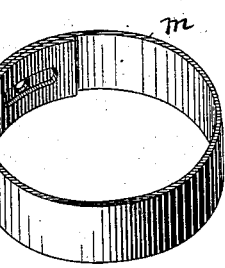
FIG. 4.
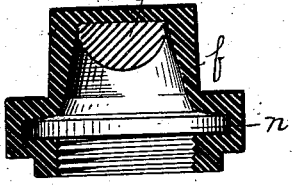
FIG. 5.
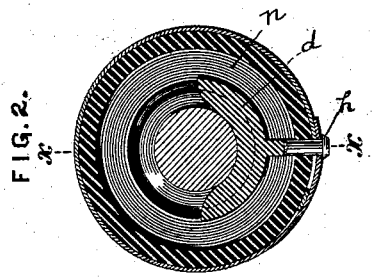
FIG. 2.
FIG. 3.
WITNESSES:
N. H. Culver.
R. Loper Baird.
INVENTORS
Simon Kennedy
Samuel G. Warner
by N. D. Culver
their Atty
N. PETERS, Photo-Lithographer, Washington, D. C.

UNITED STATES PATENT OFFICE.

SIMON KENNEDY, OF AUBURN, NEW YORK, AND SAMUEL G. WARNER, OF WILMINGTON, DELAWARE, ASSIGNORS TO THE ALFRED E. SMITH AND WARNER AXLE COMPANY, OF DELAWARE.

VEHICLE-AXLE.

SPECIFICATION forming part of Letters Patent No. 294,632, dated March 4, 1884.

Application filed July 24, 1883. (No model.)

*To all whom it may concern:*

Be it known that we, SIMON KENNEDY, of Auburn, in the State of New York, and SAMUEL G. WARNER, of Wilmington, in the State of Delaware, have jointly invented certain new and useful Improvements in Axles for Vehicles, of which the following is a specification.

Our invention relates to certain improvements in the method of securing axles of vehicles in the axle-box by means of a catch or washer fitting in an annular groove or recess in the outer end of the axle, and secured therein by a binding screw-nut; and these improvements consist of novel means for holding the catch, and in the construction of the screw-cap, as hereinafter more particularly described.

In the accompanying drawings, Figure 1 is a sectional view of the axle secured within the box by our improvement, and showing the several parts; Fig. 2, a section through the line $yy$, Fig. 1; Fig. 4, an elevation of the catch or washer, and Fig. 3 of the washer-spring; and Fig. 5, a sectional view of the screw-cap, not showing the side containing the pin connecting the spring with the washer.

The axle A, with an enlarged bearing at its inner end and a reduced bearing at its outer end, the latter of which fits within an axle-box, B, and projects beyond the end thereof, as shown at C, Fig. 1, is secured therein by means of the catch or washer $d$, fitting into an annular groove, $e$, in the outer end of the axle, at that part which projects beyond the axle-box, and which catch or washer bears against the end of the axle-box, the parts being held together by means of a binding screw-cap, $f$, within which is provided an elastic bearing, $g$, for the end of the axle. The difficulty heretofore has been on account of the undesirability of a loose washer, which, when the cap is removed, is liable to drop out and be lost. Our improvement on this part of the device consists in placing a spring on the binding screw-cap, which may be of the form shown in Fig. 3, the cap $f$ being recessed to admit a pin, $h$, connecting the end of the spring $m$ with the catch or washer $d$, and providing the cap with an internal annular groove, $n$, corresponding with the annular groove in the end of the axle, into the former of which grooves, when the parts are being put together, the catch can be pushed to admit of the entrance of the end of the axle. We also provide the binding-nut $f$ with an elastic bearing-surface, $g$, preferably of cork, against which the end of the axle constantly impinges, and which device also prevents rattling of the parts, especially when reduced by wear. That part of the outer end of the axle beyond its annular groove and which projects beyond the axle-box is hemispherical in shape; or, if partly cylindrical, the head or end is rounded, to admit of sliding smoothly over the catch while being placed in position.

The several parts are put together and operated as follows: The axle-box B, the outer end of which is screw-threaded externally, is slipped over the axle A, leaving the outer end of the latter projecting as far as the inner side of the annular groove $e$. The nut containing the catch or washer $d$ is then pressed against the rounded end of the axle, in consequence of which pressure the spring $m$ of the catch is forced back, and the catch $d$ slips into the annular groove $n$ of the nut temporarily, until the axle is pushed back against the elastic bearing in the nut, when the catch or washer, moved by the tension of the spring, will slip into the annular groove $e$ of the axle, and the spring then resume its normal position. The result is that the axle is held securely within the axle-box and cap by means of a washer, which is permanently attached to and forms a part of the device and automatically adjusts itself.

It is obvious that a spiral spring within the nut, or other form of spring, may be substituted for the external flat spring shown in the drawings; or the parts may be reversed, and the spring to which the catch or washer is attached may be inserted longitudinally in a recess drilled lengthwise in the end of the axle, omitting both the annular grooves $e$ and $n$, and having the catch projecting through a slot in the end of the axle, or projecting beyond its end, so arranged, however, that it will, as shown, bear against the axle-box when the parts are in position.

Having described our invention, we claim—

1. An axle for vehicles, having on its outer end an annular groove, and a rounded or curved head projecting beyond the axle-box, in combination with a binding screw-cap having an internal annular groove corresponding with the groove on the axle, a catch or washer to fit said grooves, and attached to said cap by means of a spring, and an axle-box with a screw-threaded end to receive said cap-nut, substantially as described.

2. A binding screw-cap provided with an elastic end bearing for the axle, in combination therewith, when the latter is held within the axle-box by means of a washer or catch, the parts being held together by said cap, substantially as set forth.

3. The combination of the axle A, with or without a grooved end, the axle-box B, with screw-threaded end, and the spring $m$, with catch or washer attached thereto, the latter operating to hold the axle and axle-box together when retained in position by a binding-nut screwed on the end of the axle-box, as set forth.

In testimony whereof we have hereunto signed our names to this specification in the presence of witnesses.

SIMON KENNEDY.
SAML. G. WARNER.

Witnesses:
WM. W. PRITCHETT,
GEO. C. WARD.